(12) United States Patent
Haseyama

(10) Patent No.: US 8,180,162 B2
(45) Date of Patent: May 15, 2012

(54) SIMILAR IMAGE RETRIEVING DEVICE

(75) Inventor: Miki Haseyama, Sapporo (JP)

(73) Assignee: National University Corporation Hokkaido University, Sapporo-Shi (JP)

( * ) Notice: Subject to any disclaimer, the term of this patent is extended or adjusted under 35 U.S.C. 154(b) by 239 days.

(21) Appl. No.: 12/673,407

(22) PCT Filed: Oct. 23, 2008

(86) PCT No.: PCT/JP2008/069193
§ 371 (c)(1),
(2), (4) Date: Feb. 12, 2010

(87) PCT Pub. No.: WO2009/060722
PCT Pub. Date: May 14, 2009

(65) Prior Publication Data
US 2011/0211772 A1 Sep. 1, 2011

(30) Foreign Application Priority Data
Nov. 6, 2007 (JP) .................................. 2007-288796

(51) Int. Cl.
*G06K 9/62* (2006.01)
(52) U.S. Cl. ........ 382/225; 382/224; 382/305; 358/403; 358/404; 707/821; 707/831
(58) Field of Classification Search .................. 382/224, 382/225, 231, 305, 308; 358/403, 404; 707/736, 707/757, 821, 831; 369/103
See application file for complete search history.

(56) References Cited

FOREIGN PATENT DOCUMENTS
JP 2006-277169 A 10/2006

OTHER PUBLICATIONS

MasahiroTada et al., "Visual Impression Modeling Using Multiple Instance Learning"( "MIL o Mochiita Shikakuteki Insho no Bunseki Gakushu to Gazo Jido Bunrui eno Oyo"), Information Processing Society of Japan Kenkyu Hokoku, Mar. 16, 2006, No. 25, pp. 13 to 18. (English abstract on p. 13).

Masahiro Tada et al., "Visual Impression Modeling Using SVM for Automatic Image Classification", Proceedings of 2006 IEEE International Conference on Systems, Man, and Cybernetics, vol. 1, IEEE, Oct. 8, 2006, Taipei, Taiwan, pp. 872-877.

(Continued)

*Primary Examiner* — Brian Q Le
*Assistant Examiner* — Edward Park
(74) *Attorney, Agent, or Firm* — Marvin A. Motsenbocker; Mots Law, PLLC

(57) ABSTRACT

A similar image retrieving device (1) comprises: an image database (21) for storage of sets of image data, and sets of keywords each associated with a corresponding image data; a cluster classification section (11) to read the sets of image data, provide a respective one of the sets of image data with a compatibility value as an index representative of a set of compatibilities of a corresponding one of the sets of keywords, and classify the sets of image data into clusters thereof in accordance with the compatibility value; an optimum cluster extracting section (12) to provide the set of query image data with a compatibility value, and select one of clusters to which the query image data is to belong to minimize an error caused in a Projection onto Convex Sets using the clusters; and a similar image extracting section (13) to output, as a similar image, a set of image data provided a close compatibility value, among the sets of image data belonging to the cluster selected by the optimum cluster extractor.

1 Claim, 3 Drawing Sheets

OTHER PUBLICATIONS

Takahiro Ogawa et al., "A Note on POCS-based Restoration of Missing Areas in Still Images; Introduction of New Classification Scheme of Local Images"( "Totsusha Eiho o Mochiita Seishi Gazochu ni Sonzai suru Kidochi Shoshitsu Ryoiki no Fukugen ni Kansuru Kosatsu Kosoku Joken ni Mochiiru Kyokusho Gazo no Bunrui ni Kansuru Kento"), ITE Technical Report, Oct. 31, 2006, vol. 30 No. 55, pp. 83 to 86. (English abstract on p. 83).

Takahiro Ogawa et al., "POCS-Based Iterative Reconstruction Algorithm of Missing Textures", Proceedings of 2007 IEEE International Conference on Image Processing, vol. 3, IEEE, Sep. 16, 2007, pp. III-101-III-104.

Abby A. Goodrum, "Image Information Retrieval: An Overview of Current Research", Journal of Information Science, vol. 3 No. 2, pp. 63-67. (2000).

Takahiro Ogawa et al., "POCS-Based Annotation Method Using Kernel PCA for Semantic Image Retrieval", IEICE Transactions on Fundamentals of Electronics, Communications and Computer Sciences, vol. E91-A, Issue 8 pp. 1915-1923. (Aug. 2008).

SIMILAR IMAGE RETRIEVING DEVICE

TECHNICAL FIELD

The present invention relates to a similar image retrieving device for retrieving an image similar to a query image.

BACKGROUND ART

An amount of images handled by individual users has been increasing with recent widespread broadband communication, high capacity recording media, widely-used digital cameras, image scanners, and the like. Accordingly, the need for an effective image retrieval method is increasing.

Conventional image retrieval methods include a retrieval method based on semantic features such as keyword sets assigned to image data sets. Besides the above, many methods have been proposed in the fields of database management and information retrieval.

For example, there is a method in which a user assigns a keyword set to an image and then inputs the keyword to retrieve a desired image. However, this method requires the user to assign the keyword set or the like to the images. Therefore, there is a problem that the appropriateness of the keyword significantly affects retrieval performance.

In order to solve the above problem, a technology of automatically providing keywords to images has been expected. One approach of this technology is a method for acquiring keywords by analyzing Web data from which image data is acquired (see Patent Document 1, for example). The method described in Patent Document 1 is limited to the case where keywords are assigned to images acquired from the Web, and thus is not a versatile method.

Moreover, there have been proposed various methods for receiving an input of a sample image as a query image (retrieval requesting image), and then for presenting an image similar to the query image (Content-Based Image Retrieval: CBIR) (see Non-patent Document 1, for example). The method described in Non-patent Document 1 or the like calculates low-level image features, such as color, texture, and shape, for each image. Then, the method described in Non-patent Document 1 or the like retrieves a similar image by regarding a distance calculated between the image features of the respective images as a distance between the images. In other words, the method described in Non-patent Document 1 or the like presents an image having the image feature most similar to that of the query image inputted by the user, as the similar image.

Patent Document 1: Japanese Patent Application Publication No. 2006-277169

Non-patent Document 1: A. A. Goodrum, "Image information retrieval: An overview of current research", Inf. Sci., vol. 3, pp. 63-66, 2000.

DISCLOSURE OF INVENTION

However, the method for simply calculating the similarity between the image features has limited retrieval accuracy since the method does not take into consideration a correlation between the low-level image features and actual semantic features.

Moreover, the conventional method only associates each image with keywords more limited in number based on the image features. For this reason, the conventional method has a difficulty in accurate retrieval for an image without one clear meaning or an image with multiple subjects.

Therefore, it is an object of the present invention to provide a similar image retrieving device for detecting an image similar to a query image with high accuracy in consideration of semantic concept of images.

In order to solve the above problem, a first aspect of the present invention relates to a similar image retrieving device for retrieval of a similar image of a query image. Specifically, the similar image retrieving device according to the first aspect of the present invention includes: an image database configured for storage of sets of image data, and sets of keyword each associated with a corresponding image data; a clustering classifier configured to read the sets of image data, provide a respective one of the sets of image data with a compatibility value as an index representative of a set of compatibilities of a corresponding one of the sets of keywords, and classify the sets of image data into clusters thereof in accordance with the compatibility value; an optimum cluster extractor configured to provide the set of query image data with a compatibility value, and select one of clusters to which the query image data is to belong to minimize an error caused in a Projection onto Convex Sets using the clusters; and a similar image extractor configured to output, as a similar image, a set of image data provided a close compatibility value, among the sets of image data belonging to the cluster selected by the optimum cluster extractor.

The present invention can provide a similar image retrieving device for detecting an image similar to a query image with high accuracy in consideration of semantic contents of images.

BEST MODE FOR CARRYING OUT THE INVENTION

Figure 1:
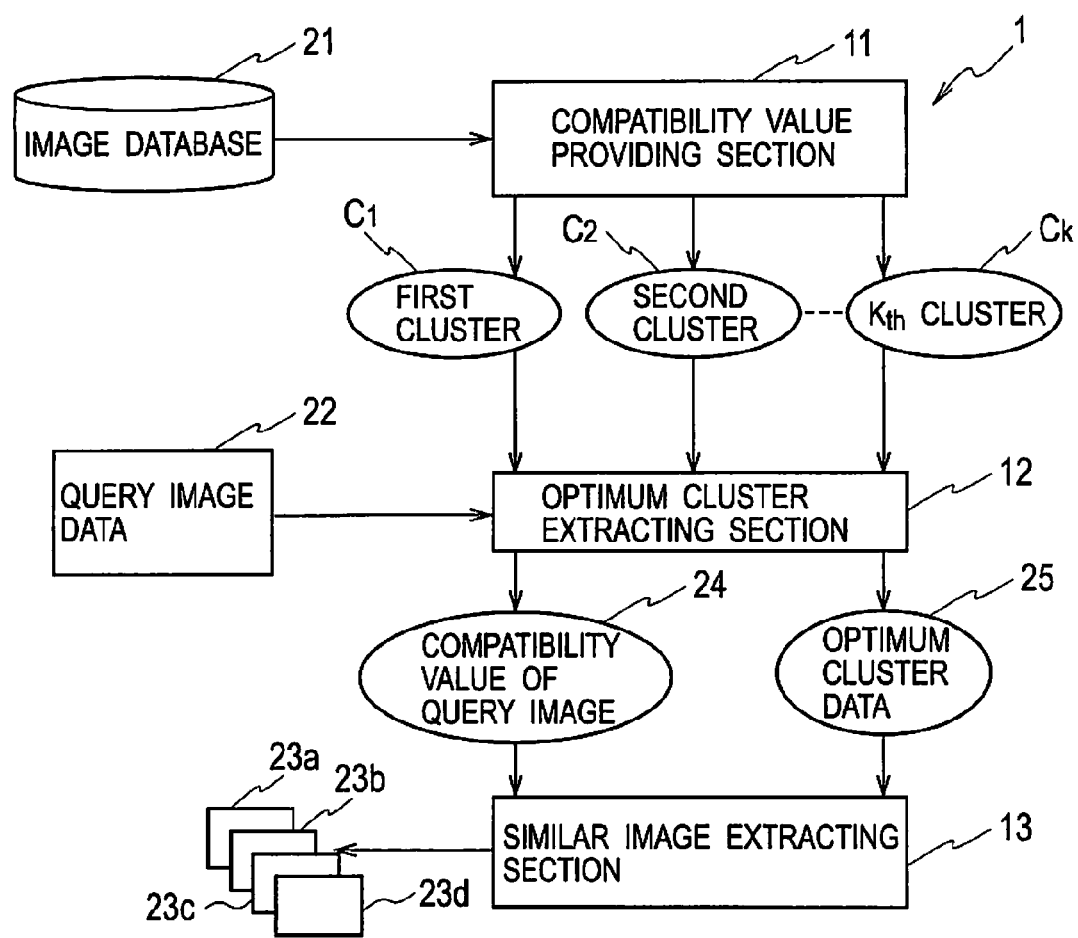
FIG. 1 is a functional block diagram of a similar image retrieving device according to a preferred embodiment of the present invention.

Next, embodiments of the present invention are described with reference to the drawings. Throughout the following descriptions of the drawings, the same or like parts bear the same or like reference numerals.

(Preferred Embodiment)

A similar image retrieving device 1 according to a preferred embodiment of the present invention retrieves an image similar to a query image.

The similar image retrieving device 1 according to the preferred embodiment of the present invention estimates an index (hereinafter referred to as a compatibility value) indicating how much each keyword is compatible with the query image, by use of a Projection onto Convex Sets, and then retrieves a similar image based on a result of the estimation. The similar image retrieving device 1 according to the preferred embodiment of the present invention enables estimation of the compatibility value for the query image by use of the Projection onto Convex Sets including the following two new elements, among images in a database provided with keywords. First, the similar image retrieving device 1 according to the preferred embodiment of the present invention classifies the images in the database on the basis of their compatibility values and introduces a nonlinear eigenspace for compatibility values and image features calculated for each cluster into constraint conditions of the Projection onto Convex Sets. The nonlinear eigenspace used in this event can express a correlation between the image feature and the compatibility value. Therefore, the similar image retrieving device 1 can calculate compatibility values of all the keywords only from the image feature of the query image. Secondly, the similar image retrieving device 1 according to the preferred embodiment of the present invention selects a cluster to which the query image belongs by focusing attention on a convergence error of the Projection onto Convex Sets. Thus, the similar image retrieving device 1 can adaptively select a cluster containing the image similar to the query image. Therefore, the similar image retrieving device 1 can calculate the compatibility value of the query image by use of an optimum cluster.

Thus, the similar image retrieving device 1 according to the preferred embodiment of the present invention can estimate the compatibility value of each keyword for the query image. The similar image retrieving device 1 can retrieve a similar image with high accuracy by calculating a distance between the image in the database and the compatibility value.

(Hardware Configuration of Similar Image Retrieving Device)

Figure 2:
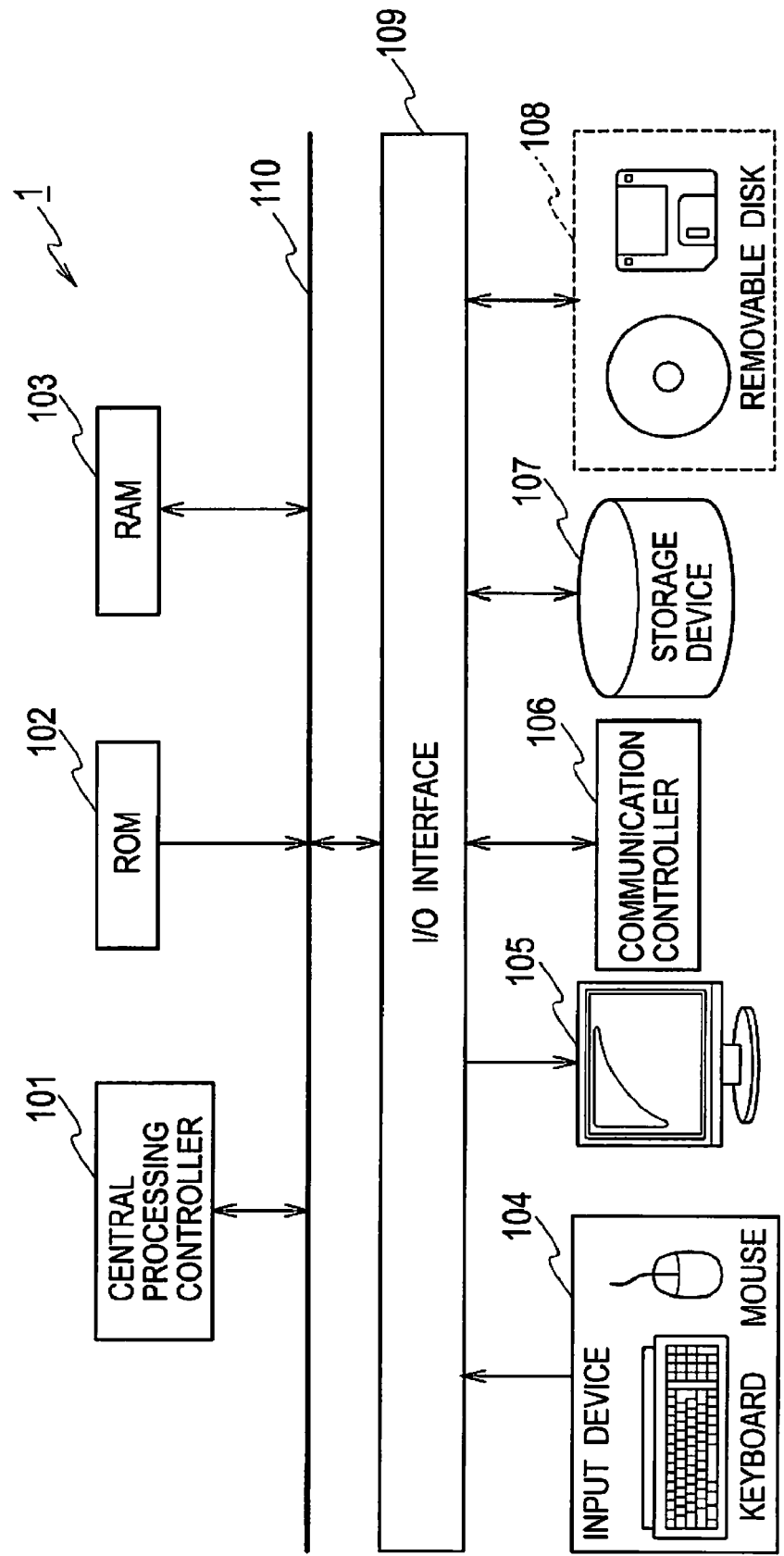
FIG. 2 is a hardware configuration diagram of the similar image retrieving device according to a preferred embodiment of the present invention.

As shown in FIG. 2, in the similar image search device 1 according to the preferred embodiment of the present invention, a central processing controller 101, a ROM (Read Only Memory) 102, a RAM (Random Access Memory) 103 and an I/O interface 109 are connected to one another through a bus 110. An input device 104, a display device 105, a communication controller 106, a storage device 107 and a removable disk 108 are connected to the I/O interface 109.

The central processing controller 101 reads and executes a boot program for starting the similar image search device 1 from the ROM 102 on the basis of an input signal from the input device 104, and also reads an operating system stored in the storage device 107. Furthermore, the central processing controller 101 is a processor configured to control the various devices based on input signals from the input device 104, the communication controller 106 and the like, read programs and data stored in the RAM 103, the storage device 107 and the like and load the programs and data into the RAM 103, and implement a series of processes to be described later, such as calculation and processing of data in accordance with a command of the program read from the RAM 103.

The input device 104 includes input devices, such as a keyboard and a mouse, which are used by an operator to input various operations. The input device 104 creates an input signal in accordance with the operation by the operator and transmits the signal to the central processing controller 101 through the I/O interface 109 and the bus 110. The display device 105 is a CRT (Cathode Ray Tube) display, a liquid crystal display or the like, and is a device configured to receive an output signal to be displayed on the display device 105 from the central processing controller 101 through the bus 110 and the I/O interface 109 and to display a result of processing by the central processing controller 101, and the like, for example. The communication controller 106 is a device such as a LAN card and a modem, which is configured to connect the similar image search device 1 to a communication network such as the Internet or a LAN. The data transmitted to or received from the communication network through the communication controller 106 is transmitted to and received from the central processing controller 101 through the I/O interface 109 and the bus 110 as an input signal or an output signal.

The storage device 107 is a semiconductor storage device or a magnetic disk device, and stores data and programs to be executed by the central processing controller 101. The removable disk 108 is an optical disk or a flexible disk, and signals read or written by a disk drive are transmitted to and received from the central processing controller 101 through the I/O interface 109 and the bus 110.

The storage unit 107 of the similar image retrieving device 1 according to the preferred embodiment of the present invention stores a similar image retrieval program, an image database 21, and query image data 22. Moreover, the similar image retrieval program is read and executed by the central processing controller 101 of the similar image retrieving device 1, thereby implementing a cluster classification section (a cluster classifier) 11, an optimum cluster extracting section (an optimum cluster extractor) 12 and a similar image extracting section (a similar image extractor) 13 in the similar image retrieving device 1.

(Functional Blocks of Similar Image Retrieving Device)

As shown in FIG. 1, the similar image retrieving device 1 according to the preferred embodiment of the present invention includes the image database 21, the cluster classification section 11, the optimum cluster extracting section 12 and the similar image extracting section 13.

The image database 21 stores therein a plurality of pieces of image data and keyword sets related to the image data sets in association with one another.

The cluster classification section 11 reads the image data from the image database 21 and provides each image data set with a compatibility value that is an index indicating compatibility of each keyword. The cluster classification section 11 also classifies the image data sets into clusters on the basis of their compatibility values. As shown in FIG. 1, the cluster classification section 11 classifies the pieces of image data into a first cluster $C_1$, a second cluster $C_2$ ... and a $K_{th}$ cluster $C_K$ on the basis of the compatibility values provided to the image data set.

The optimum cluster extracting section 12 provides a compatibility value to the query image data 22 and selects a cluster to which the query image data 22 belongs among the clusters so that an error caused by the use of the Projection onto Convex Sets in using each of the clusters is minimized. As shown in FIG. 1, the optimum cluster extracting section 12 calculates a compatibility value 24 of the query image data 22. The optimum cluster extracting section 12 also determines a cluster to which the compatibility value 24 of the query image data 22 belongs among the clusters including the first cluster $C_1$, the second cluster $C_2$ ... and the $K_{th}$ cluster $C_K$ which are generated by the cluster classification section 11, and then outputs the determined cluster as an optimum cluster 25.

The similar image extracting section 13 outputs, as similar image data 23a, 23b, 23c ..., pieces of image data with a small distance between the compatibility values among the image data sets belonging to the cluster selected by the optimum cluster extracting section 12. The similar image extracting section 13 outputs the image data belonging to the optimum cluster 25 as the image data 23a, 23b, 23c ... similar to the query image data 22.

(Projection onto Convex Sets)

Here, the Projection onto Convex Sets used in the preferred embodiment of the present invention will be described.

The Projection onto Convex Sets is used as a nonlinear image restoration method by Youla, Webb, at al. The Projection onto Convex Sets is a method for estimating an original image f∈H (H represents a Hilbert space) from known features of the original image. When n kinds of features of the original image are represented by n closed convex sets $C_k$ (k=1, 2, ..., n), an intersection thereof, which is expressed by the following Equation (1), is the closed convex set and contains the original image f.

[Expression 1]

$$\hat{C} = \bigcap_{k=1}^{n} C_k \qquad \text{Equation (1)}$$

[Expression 2]

$$(f \in \hat{C})$$

Therefore, retrieval of Expression 4 contained in Expression 3 from an arbitrary $f_0$ makes it possible to obtain a result of approximation of the original image. However, Expression 5 is generally nonlinear and complex in structure, and thus cannot be easily described.

$\hat{C}$ [Expression 3]

$\hat{f}$ [Expression 4]

$\hat{C}$ [Expression 5]

Therefore, in such a case, the similar image retrieving device 1 calculates Expression 8 by use of a projection element $P_k$ to a closed convex set which is expressed by Expression 7 and which satisfies the following Equation (2).

[Expression 6]

$$\|f - p_k f\| = \min_{g \in C_k} \|f - g\| \qquad \text{Equation (2)}$$

[Expression 7]

$C_k(k = 1, 2, \ldots, n)$

[Expression 8]

$\hat{f}$

Figure 3:
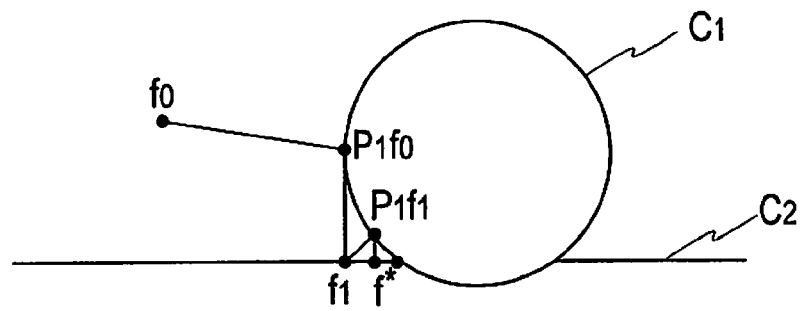
FIG. 3 is a diagram illustrating repetition in a Projection onto Convex Sets used in the similar image retrieving device according to the preferred embodiment of the present invention.

To be more specific, as shown in FIG. 3, by use of a property that the following Equation (3) is converged to Expression 11 contained in Expression 10 by repetition processing, the result of approximation of the original image from the arbitrary $f_0$ is obtained.

[Expression 9]

$$f_t = P_n P_{n-1} \ldots P_2 P_1 f_{t-1} (t=1,2,\ldots) \qquad \text{Equation (3)}$$

$\hat{C}$ [Expression 10]

$\hat{f}$ [Expression 11]

(Overview of Similar Image Retrieval Method Using Projection onto Convex Sets)

Description will be given of an overview of a method for calculating a compatibility value of each keyword for the query image by use of the Projection onto Convex Sets described above and retrieving a similar image based on a result of the calculation. The similar image retrieving device 1 according to the preferred embodiment of the present invention previously classifies the images in the database on the basis of the compatibility values of their keywords. Moreover, on the basis of the obtained result of the classification, the similar image retrieving device 1 also estimates compatibility values of all the keywords for the query image by use of the Projection onto Convex Sets including the following two new elements.

(i) Introduction of a nonlinear eigenspace of image features and their compatibility values of the keyword into constraint conditions of the Projection onto Convex Sets.

(ii) Adaptive selection of a cluster to which the query image belongs by focusing on a convergence error of the Projection onto Convex Sets.

The nonlinear eigenspace used in (i) can express a correlation between the image feature and the compatibility value of the keyword. Therefore, the use of the nonlinear eigenspace allows expectation to estimate the compatibility value of each keyword only from the image feature of the query image. Furthermore, the use of (ii) allows determination of a cluster containing the image similar to the query image. Thus, the cluster used for calculation of the compatibility value can be adaptively selected. The use of the compatibility value thus obtained enables retrieval of the image similar to the query image from the database in the preferred embodiment of the present invention.

(Calculation of Nonlinear Eigenspace of Each Cluster)

Here, detailed description will be given of processing of classifying the image data sets present in the image database on the basis of the compatibility values of their keywords and then calculating a nonlinear eigenspace for each of the clusters obtained. This processing corresponds to the cluster classification section 11 in FIG. 1.

Here, N images present in the image database are set as $f_i$ (i=1, 2, ..., N) and the number of all keywords provided to those images is L. In the preferred embodiment of the present invention, the similar image retrieving device 1 first calculates a vector expressed by Expression 12 which has each element 1 or 0 for each image $f_i$.

$$\tilde{x}_i = [\tilde{x}_i^1, \tilde{x}_i^2, \ldots, \tilde{x}_i^L]' \qquad \text{[Expression 12]}$$

In this event, the following Expression 13 becomes 1 if the image $f_i$ contains the l-th keyword and becomes 0 if not.

$$\tilde{x}_i^l (l=1,2,\ldots,L) \qquad \text{[Expression 13]}$$

Furthermore, the similar image retrieving device 1 calculates the following Equation 4 for each vector obtained expressed by the following Expression 14.

[Expression 14]

$$x_i \qquad \text{Equation (4)}$$

[Expression 15]

$$x_i = \frac{\tilde{x}_i}{\|\tilde{x}_i\|}$$

Thus, the vector $x_i$ containing the compatibility value of each keyword in each element is calculated. In the preferred embodiment of the present invention, the above vector $x_i$ is regarded as a feature vector containing semantic features of each image $f_i$, and the similar image retrieving device 1 classifies the images into K clusters so as to minimize C in the following equation.

[Expression 16]

$$C = \sum_{i=1}^{N}\sum_{j=1}^{N} s(i, j)\|x_i - x_j\|^2 \qquad \text{Equation (5)}$$

Note, however, that s (i, j) becomes 1 when the images $f_i$ and $f_j$ belong to the same cluster and becomes 0 when the images belong to different clusters. Here, when attention is focused on $\|x_i\|=1$ and $\|x_j\|=1$, Equation (5) is turned into Equation (6).

[Expression 17]

$$C = \sum_{i=1}^{N}\sum_{j=1}^{N} s(i, j)(2 - 2x_i'x_j) \qquad \text{Equation (6)}$$

In Equation (6), Expression 18 approaches 1 as the images $f_i$ and $f_j$ have the same keywords more, and becomes 0 when the images $f_i$ and $f_j$ do not have the same keyword. Therefore, the index C takes a small value when the images belonging to the same cluster contain the same keywords more. Thus, by minimizing the index C, the similar image retrieving device 1 can perform classification based on the compatibility value of the keyword.

$$x_i'x_j \qquad \text{[Expression 18]}$$

The similar image retrieving device 1 can classify the images present in the image database in the above described manner. As concrete classification processing, the similar image retrieving device 1 first classifies all the images into K clusters in a random manner. Thereafter, when the index C expressed by Equation (6) is made smaller as a result of switching between clusters to which any two images respectively belong, the similar image retrieving device 1 uses the switched clusters as a new cluster arrangement. By repeating this processing, the similar image retrieving device 1 can sequentially obtain optimum cluster arrangements in a hill-climbing manner.

Next, the similar image retrieving device 1 according to the preferred embodiment of the present invention calculates, from the images belonging to each cluster, a nonlinear eigenspace associated with an image feature of each image and the compatibility value of the keyword. First, the similar image retrieving device 1 according to the preferred embodiment of the present invention divides $M^k$ images, which is expressed by Expression 19, contained in the cluster k (k=1, 2, ..., K) into B×B blocks $$f_j^k (j=1,2,\ldots,M^k) \qquad \text{[Expression 19]}$$

and calculates a color histogram with the number of bins Q for each block. Furthermore, the similar image retrieving device 1 calculates a vector expressed by Expression 20 in which the color histograms calculated for all the blocks are sequentially arranged, and obtains Expression 22 by mapping the vector expressed by Expression 20 in a high-dimensional feature space by nonlinear mapping expressed by Expression 21.

$$y_j^k (\in R^{QB^2}) \qquad \text{[Expression 20]}$$

$$\phi: R^{QB^2} \to F \qquad \text{[Expression 21]}$$

$$\phi(y_j^k) \qquad \text{[Expression 22]}$$

Note that the following Expression 23 is in a very high dimension and it is difficult to directly calculate this. As a calculation technique to solve this problem, the kernel trick is used. In this calculation technique, when arbitrary x and y($\in R^{QB^2}$) are given, an inner product of $\phi(x)$ and $\phi(y)$ ($\in F$), which is expressed by Expression 24, is calculated from x and y by a kernel function K as shown in the following equation.

$$\phi(y_j^k) \qquad \text{[Expression 23]}$$

$$\phi(x)'\phi(y) \qquad \text{[Expression 24]}$$

[Expression 25]

$$\phi(x)'\phi(y) = \kappa(x,y) \qquad \text{Equation (7)}$$

Note that a function which satisfies Mercer's condition is used as the kernel function $\kappa(x, y)$ and a Gaussian kernel in the following equation is used herein.

[Expression 26]

$$\kappa(x, y) = \exp\left(-\frac{\|x - y\|^2}{\sigma^2}\right) \qquad \text{Equation (8)}$$

Furthermore, in the preferred embodiment of the present invention, a vector $x_i$ of the compatibility value of the image $f_i$ belonging to the cluster k is expressed by the following Expression 27, and a vector expressed by Expression 30 in the following equation is defined from Expression 28 and Expression 29.

[Expression 27]

$$x_j^k \qquad \text{Equation (9)}$$

[Expression 28]

$$x_j^k$$

[Expression 29]

$$\phi(y_j^k)$$

[Expression 30]

$$z_j^k$$

[Expression 31]

$$z_j^k = \begin{bmatrix} \phi(y_j^k) \\ x_j^k \end{bmatrix}$$

Here, when Expression 33 is defined by the vector expressed by Expression 32 in the above equation, $\Xi^k$ satisfies the following a formula for singular value decomposition.

$$z_j^k \qquad \text{[Expression 32]}$$

$$\Xi^k = [z_1^k, z_2^k, \ldots, z_{M^k}^k] \qquad \text{[Expression 33]}$$

[Expression 34]

$$\Xi^k H^k \cong U^k \Lambda^k V^{k\prime} \qquad \text{Equation (10)}$$

In this event, $H^k$ is a centering matrix of $M^k \times M^k$. Moreover, Equations (11) and (12) are $D^k$-dimensional eigenvector matrices with Expression 37 and Expression 38 as covariance matrices.

[Expression 35]

$$U^k = [u_1^k, u_2^k, \ldots, u_{D^k}^k] \quad \text{Equation (11)}$$

[Expression 36]

$$V^k = [v_1^k, v_2^k, \ldots, v_{D^k}^k] \quad \text{Equation (12)}$$

$$\Xi^k H^k H^k \Xi^{k\prime} \quad \text{[Expression 37]}$$

$$H \Xi^{k\prime} \Xi^k H^k \quad \text{[Expression 38]}$$

$\Lambda^k$ is an eigenvalue matrix of those described above. The use of $U^k$ obtained by Equation (10) enables the similar image retrieving device 1 according to the preferred embodiment of the present invention to project an arbitrary vector in the same dimension as that of Expression 40 into a nonlinear eigenspace defined by the eigenvector expressed by Expression 39.

$$u_d^k (d=1, 2, \ldots, D^k) \quad \text{[Expression 39]}$$

$$z_j^k \quad \text{[Expression 40]}$$

However, each column expressed by Expression 41 in the matrix $U^k$ is in a high dimension and thus cannot be directly calculated. Therefore, to solve this problem using the kernel trick, the similar image retrieving device 1 according to the preferred embodiment of the present invention derives the following Equation (13) from the singular value decomposition formula (10), and enables projection by using the equation.

$$u_d^k (d=1, 2, \ldots, D^k) \quad \text{[Expression 41]}$$

[Expression 42]

$$U^k \approx \Xi^k H^k V^k \Lambda^{k-1} \quad \text{Equation (13)}$$

Thus, in the preferred embodiment of the present invention, the nonlinear eigenspace can be calculated for each cluster by classifying the images in the database.

(Similar Image Retrieval Using Projection onto Convex Sets)

By use of the Projection onto Convex Sets in which the nonlinear eigenspace obtained by the processing described above is introduced into constraint conditions, the similar image retrieving device 1 estimates a compatibility value of each keyword for the query image of which only the image feature is known. Furthermore, the similar image retrieving device 1 can retrieve an image similar to the query image from the database by use of the obtained compatibility value. This processing corresponds to the optimum cluster extracting section 12 in FIG. 1.

The similar image retrieving device 1 according to the preferred embodiment of the present invention first calculates y for the query image f as in the case of the vector $y_i$ of the image $f_i$ in the database. Moreover, a vector having an unknown compatibility value of the query image f is assumed to be x as in the case of the vector $x_i$ of the image $f_i$ in the database, and z is defined as in the following equation.

[Expression 43]

$$z = \begin{bmatrix} \phi(y) \\ x \end{bmatrix} \quad \text{Equation (14)}$$

Furthermore, the similar image retrieving device 1 according to the preferred embodiment of the present invention calculates Expression 44 which satisfies the following two constraint conditions for the vector z, thereby estimating an unknown vector x.

$$\hat{z} \quad \text{[Expression 44]}$$

[Constraint Condition 1]

The vector y is a vector calculated directly from the query image and is not changed.

[Constraint Condition 2]

In the high-dimensional feature space, the vector expressed by Expression 45 is present in an eigenspace defined by an eigenvector expressed by Expression 46 of the cluster k, and satisfies the following equation.

$$\hat{z} \quad \text{[Expression 45]}$$

$$u_1^k, u_2^k, \ldots, u_{D^k}^k \quad \text{[Expression 46]}$$

[Expression 47]

$$u_1^k, u_2^k, \ldots, u_{D^k}^k \quad \text{Equation (15)}$$

However, the above equation is transformed by Equation (13) into the following equation.

[Expression 48]

$$\hat{z} = \Xi^k H^k V^k \Lambda^{k-2} V^k H^{k\prime} \Xi^{k\prime} \hat{z} \quad \text{Equation (16)}$$

In the preferred embodiment of the present invention, the closed convex sets which satisfy the above two constraint conditions are assumed to be $C_1$ and $C_2$, and the similar image retrieving device 1 outputs Expression 49, which is converged by the Projection onto Convex Sets with z as an initial vector, as an estimation result.

$$\hat{z} \quad \text{[Expression 49]}$$

Here, when Expression 50 is established with attention focused on [Constraint Condition 1], Equation (16) is transformed into the following Equation (17).

[Expression 50]

$$\hat{z} = [\phi(y)', \hat{x}']' \quad \text{Equation (17)}$$

[Expression 51]

$$\begin{bmatrix} \phi(y) \\ \hat{x} \end{bmatrix} = \Xi^k H^k V^k \Lambda^{k-2} V^k H^{k\prime} \begin{bmatrix} \Xi_y^{k\prime} & X^{k\prime} \end{bmatrix} \begin{bmatrix} \phi(y) \\ \hat{x} \end{bmatrix}$$
$$= \Xi^k H^k V^k \Lambda^{k-2} V^k H^{k\prime} \left( \Xi_y^{k\prime} \phi(y) + X^{k\prime} \hat{x} \right)$$

However, Equations (18) and (19) are established, and Expression 54 in Equation (17) is given by the following Equation (20).

[Expression 52]

$$\Xi_y^k = [\phi(y_1^k), \phi(y_2^k), \ldots, \phi(y_{M^k}^k)] \quad \text{Equation (18)}$$

[Expression 53]

$$X^k = [x_1^k, x_2^k, \ldots, x_{M^k}^k] \quad \text{Equation (19)}$$

[Expression 54]

$$\Xi_y^{k\prime} \phi(y)$$

-continued

[Expression 55]

$$\Xi_y^{k'}\phi(y) = [\phi(y_1^k), \phi(y_2^k), \ldots, \phi(y_{M^k}^k)]'\phi(y) \quad \text{Equation (20)}$$
$$= [\phi(y_1^k)'\phi(y), \phi(y_2^k)'\phi(y), \ldots, \phi(y_{M^k}^k)'\phi(y)]'$$
$$= [\kappa(y_1^k, y), \kappa(y_2^k, y), \ldots, \kappa(y_{M^k}^k, y)]'$$

Therefore, the vector expressed by Expression 56 can be obtained by repeating calculation of the following Expression 57.

$$\hat{x} \quad \text{[Expression 56]}$$

$$\hat{x}_t \quad \text{[Expression 57]}$$

[Expression 58]

$$\hat{x}_t = X^k H^k V^k \Lambda^{k-2} V^k H^{k\prime}(\Xi_y^{k}\phi(y) + X^{k\prime}\hat{x}_{t-1}) \quad \text{Equation (21)}$$

Thus, the similar image retrieving device 1 according to the preferred embodiment of the present invention can calculate the following vector expressed by Expression 59, and can obtain the following compatibility value, expressed by Expression 60, of the l-th keyword for the query image.

$$\hat{x} = [\hat{x}^1, \hat{x}^2, \ldots, \hat{x}^L]' \quad \text{[Expression 59]}$$

$$\hat{x}^l \quad \text{[Expression 60]}$$

Here, when attention is focused on the nonlinear eigenspace used in [Constraint Condition 2] in the preferred embodiment of the present invention, the eigenspace subjects the following vectors expressed by Expression 61 belonging to the same cluster to least squares approximation, the same cluster existing in a subspace in the same dimension present in the high-dimensional feature space.

$$z_j^k (j=1,2,\ldots,M^k) \quad \text{[Expression 61]}$$

Therefore, when the cluster to which the vector z belongs is known, the similar image retrieving device 1 according to the preferred embodiment of the present invention uses the non-linear eigenspace to estimate the following Expression 62, thereby enabling accurate calculation of the compatibility value of the keyword.

$$\hat{x} \quad \text{[Expression 62]}$$

However, in the preferred embodiment of the present invention, the compatibility value of each keyword for the query image is unknown. Thus, the similar image retrieving device 1 cannot determine the cluster to which the query image belongs based on Equation (6). Therefore, to solve this problem, in the preferred embodiment of the present invention, with attention focused on the following square error expressed by Equation 22 converged in the known vector y by the Projection onto Convex Sets, the similar image retrieving device 1 selects a cluster which minimizes the error as the cluster to which the query image belongs.

[Expression 63]

$$\tilde{C}^k = \|y - \hat{y}\|^2 \quad \text{Equation (22)}$$

Note that Expression 64 in Equation (22) satisfies the following Equation (23).

$$\hat{y} \quad \text{[Expression 64]}$$

[Expression 65]

$$\phi(\hat{y}) = \Xi_y^x H^k V^k \Lambda^{k-2} V^k H^{k\prime}(\Xi_y^{k}\phi(y) + X^{k\prime}\hat{x}) \quad \text{Equation (23)}$$

Furthermore, since the following Equation (24) is established based on the Gaussian kernel equation (8), Expression 67 in Equation (22) is transformed into the following Equation (25).

[Expression 66]

$$\phi(y)'\phi(\hat{y}) = \exp\left(-\frac{\|y - \hat{y}\|^2}{\sigma^2}\right) \quad \text{Equation (24)}$$

[Expression 67]

$$\tilde{C}^k$$

[Expression 68]

$$\tilde{C}^k = -\sigma^2 \log\{\phi(y)'\phi(\hat{y})\} \quad \text{Equation (25)}$$
$$= -\sigma^2 \log\{\phi(y)'\Xi_y^k H^k V^k \Lambda^{k-2} V^k H^{k\prime} \Xi^{k\prime}$$
$$(\Xi_y^{k'}\phi(y) + X^{k'}\hat{x})\}$$

The index calculated as described above, which is expressed by Expression 69, is the smallest distance between the vector, which is expressed by Expression 70, of the query image and the nonlinear eigenspace of the cluster k under the constraint conditions of the Projection onto Convex Sets.

$$\tilde{C}^k \quad \text{[Expression 69]}$$

$$\tilde{z} \quad \text{[Expression 70]}$$

Therefore, in the preferred embodiment of the present invention, the use of the index enables the similar image retrieving device 1 to adaptively select a cluster containing the image similar to the query image.

Lastly, in the preferred embodiment of the present invention, the similar image retrieving device 1 sets an element of the vector expressed by Expression 71, which is obtained by using the selected cluster, as a final compatibility value of the keyword for the query image.

$$\hat{x} \quad \text{[Expression 71]}$$

Thus, the similar image retrieving device 1 according to the preferred embodiment of the present invention can calculate the compatibility value of the keyword for the query image. Furthermore, the similar image retrieving device 1 according to the preferred embodiment of the present invention uses the vector, which is expressed by Expression 72, of the compatibility value to sequentially output the images which minimize the following index $S_i$ expressed by Equation 26 as images similar to the query image, among the images in the database belonging to the same cluster.

[Expression 72]

$$\hat{x}$$

[Expression 73]

$$S_i = \|\hat{x} - x_i\|^2 \quad \text{Equation (26)}$$
$$= 2 - 2\hat{x}'x_i$$

Thus, the similar image retrieving device 1 according to the preferred embodiment of the present invention can retrieve the image based on the compatibility value of the keyword. Consequently, retrieval of similar images based on contents of the images is achieved.

(Effects)

Next, description will be given of an experiment for evaluating performance of the similar image retrieving device according to the preferred embodiment of the present invention.

For the experiment, an image database having 5000 images is used. Note that each of the images is provided with 30 to 40 keywords. The total number of all the keywords present in the image database is 4847. To be more specific, in this experiment, the similar image retrieving device 1 retrieves an image similar to a query image Q1 shown in FIG. 4 from the image database. The query image Q1 is an image of maple leaves that have turned red (red is blank displayed in FIG. 4).

Figure 4:
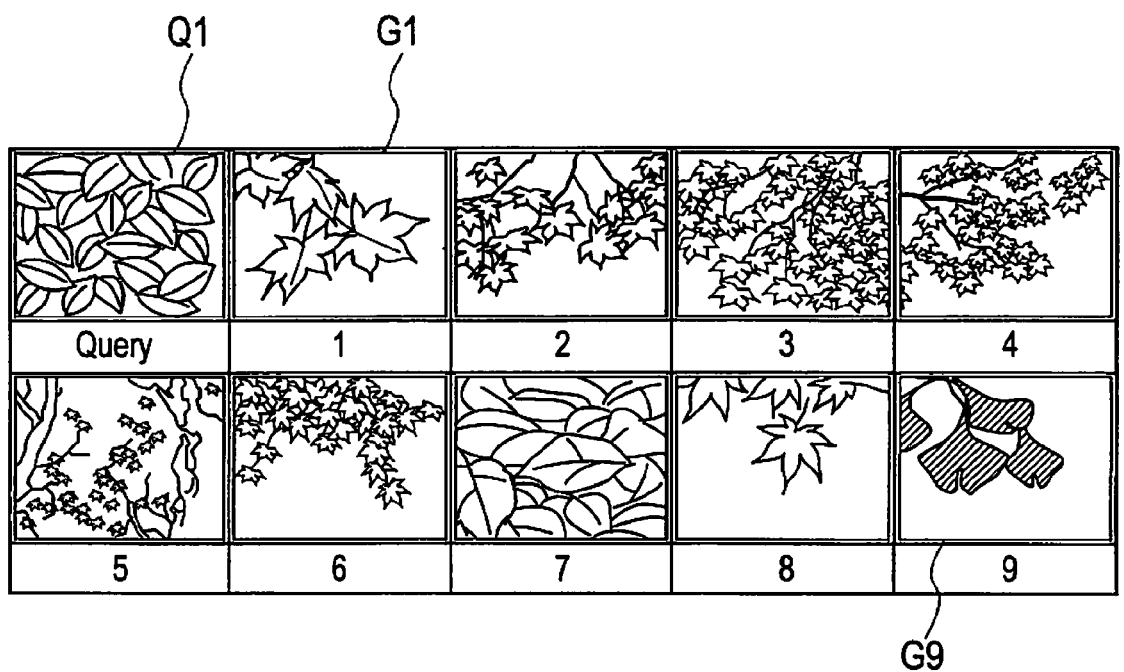
FIG. 4 is a diagram illustrating an example of a result of similar image retrieval processing by the similar image retrieving device according to the preferred embodiment of the present invention.

The similar image retrieving device 1 classifies the images described above on the basis of the compatibility values of their keywords, and thus generates 25 clusters. Furthermore, FIG. 4 shows a result of retrieval of similar images to the query image Q1 by use of the Projection onto Convex Sets. Note that FIG. 4 shows a retrieval result of top nine images having a small distance calculated by Equation (27) for the query image Q1. In the retrieval result, the similar image G9 contains yellow ginkgo leaves (yellow is hatched in FIG. 4).

From the above result, it is confirmed that the similar image retrieving device 1 according to the preferred embodiment of the present invention can retrieve images having contents similar to that of the query image.

The conventional retrieval method based on the image contents retrieves images having image features most similar to that of the query image. Therefore, since such a method has a difficulty in using a correlation between a low-level image feature and actual semantic features, retrieval accuracy thereof is limited. For example, use of color information of the images causes the image of the leaves that have turned red and the image of the leaves that have turned yellow to be determined to be not similar images even when both the images show the same autumn leaves. Accordingly, the conventional retrieval method has a difficulty to retrieve the similar images even though the images contain the same contents as that of the query image, i.e., even the images are of the autumn leaves, because of the significant difference in the image feature therebetween.

On the other hand, the similar image retrieving device 1 according to the preferred embodiment of the present invention makes it possible to estimate the compatibility value of the keyword by use of the Projection onto Convex Sets on the basis of the image feature of the query image. Furthermore, a distance between the images in the database is calculated by using the obtained compatibility value of the keyword. Thus, the similar image retrieving device 1 can retrieve the images containing the same contents as the similar images even when image features thereof are significantly different from each other. Therefore, the similar image retrieving device 1 according to the preferred embodiment of the present invention can retrieve the images having similar contents as shown in FIG. 4.

Thus, the similar image retrieving device 1 according to the preferred embodiment of the present invention achieves a similar image retrieval method based on image contents by use of the Projection onto Convex Sets. The similar image retrieving device 1 according to the preferred embodiment of the present invention classifies the images in the database and introduces a nonlinear eigenspace calculated for the compatibility value of the keyword and an image feature for each cluster into constraint conditions of the Projection onto Convex Sets. As a result, the similar image retrieving device 1 can calculate, by use of the Projection onto Convex Sets, the compatibility value of the keyword for the query image of which only the image feature is known.

Furthermore, the similar image retrieving device 1 according to the preferred embodiment of the present invention can calculate the compatibility value from the cluster containing the images similar to the query image by adaptively selecting the cluster which minimizes the error converged by the Projection onto Convex Sets.

The similar image retrieving device 1 according to the preferred embodiment of the present invention can retrieve images containing contents similar to that of the query image by use of the compatibility value of the keyword thus obtained.

(Other Embodiments)

Although the present invention has been described as above with reference to the preferred embodiments of the present invention, it should be understood that the present invention is not limited to the description and drawings which constitute a part of this disclosure. From this disclosure, various alternative embodiments, examples and operational technologies will become apparent to those skilled in the art.

For example, the similar image search device described in the preferred embodiment of the present invention may be configured on one piece of hardware as shown in FIG. 1 or may be configured on a plurality of pieces of hardware according to functions and the number of processes. Alternatively, the similar image search device may be implemented in an existing information system.

As a matter of course, the present invention includes various embodiments and the like which are not described herein. Therefore, the technical scope of the present invention is defined only by matters to define the invention according to the scope of claims reasonably understood from the foregoing description.

The invention claimed is:

1. A similar image retrieving device for retrieval of a similar image of a query image, comprising:
    an image database configured for storage of sets of image data, and sets of keywords each associated with a corresponding image data;
    a clustering classifier configured to read the sets of image data, provide a respective one of the sets of image data with a compatibility value as an index representative of a set of compatibilities of a corresponding one of the sets of keywords, and classify the sets of image data into clusters thereof in accordance with the compatibility value;
    an optimum cluster extractor configured to provide the set of query image data with a compatibility value, and select one of clusters to which the query image data is to belong to minimize an error caused in a Projection onto Convex Sets using the clusters; and
    a similar image extractor configured to output, as a similar image, a set of image data provided a close compatibility value, among the sets of image data belonging to the cluster selected by the optimum cluster extractor.

* * * * *